United States Patent [19]
Mickelson

[11] 4,139,493
[45] Feb. 13, 1979

[54] SILICA-PROMOTED HYDROFINING CATALYST AND PROCESS

[75] Inventor: Grant A. Mickelson, Yorba Linda, Calif.

[73] Assignee: Union Oil Company of California, Los Angeles, Calif.

[21] Appl. No.: 821,334

[22] Filed: Aug. 3, 1977

[51] Int. Cl.² ............... B01J 29/06; B01J 29/00; B01J 29/10
[52] U.S. Cl. ............... 252/455 R; 252/458; 252/459; 208/216 R
[58] Field of Search ............... 252/455 R, 458, 465; 208/216

[56] References Cited

U.S. PATENT DOCUMENTS

| | | | |
|---|---|---|---|
| 2,918,510 | 12/1959 | Carr et al. | 252/458 X |
| 3,661,805 | 5/1972 | Horvath | 252/458 X |
| 3,703,461 | 11/1972 | Hansford | 252/455 R |
| 3,726,790 | 4/1973 | Gallagher et al. | 252/455 R |
| 3,778,388 | 12/1973 | Cornelius et al. | 252/465 |
| 3,830,752 | 8/1974 | Mickelson | 252/458 X |

Primary Examiner—Carl Dees
Attorney, Agent, or Firm—Lannas S. Henderson; Richard C. Hartman; Dean Sandford

[57] ABSTRACT

Highly active hydrofining catalysts are prepared by ion exchanging a silica-alumina hydrogel with an ammoniacal solution of a cobalt and/or nickel compound, and thereafter compositing the undried product with an alumina hydrogel and a molybdenum component, followed by drying and calcining. The resulting catalysts are particularly active for the denitrogenation of mineral oil feedstocks.

14 Claims, 1 Drawing Figure

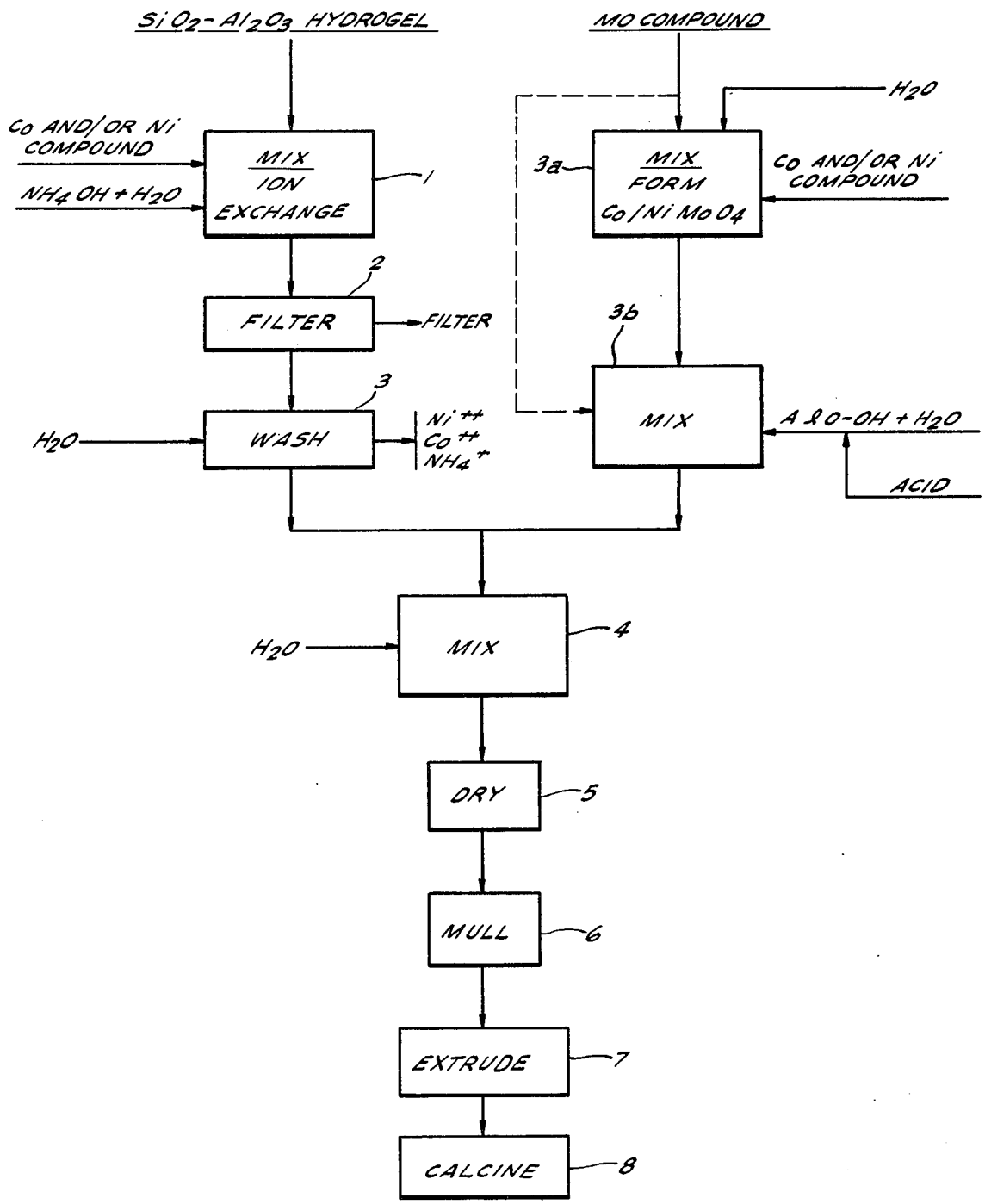

SILICA-PROMOTED HYDROFINING CATALYST AND PROCESS

BACKGROUND AND SUMMARY OF INVENTION

It is known in the art that the activity of Co-Mo-Al$_2$O$_3$ and Ni-Mo-Al$_2$O$_3$ catalysts for denitrogenation and to a lesser extent for desulfurization of mineral oils can be improved by incorporating minor proportions of silica therein, usually as a cogel with the alumina component. Conventionally, an alumina-silica cogel base is prepared by coprecipitation, followed by washing, adding alumina hydrogel, drying, pelleting or extruding, and calcining. The calcined base is then impregnated with an aqueous solution of solutions of Co and/or Ni salts, and with a soluble Mo compound such as ammonium heptamolybdate. The impregnated base is then again dried and calcined. This procedure is expensive, involving at least two calcinations, and moreover does not provide an optimum distribution and retention of active sites, particularly the Ni and/or Co hydrogenation sites and the protonic acidity sites generated by the alumina-silica cogel.

I have now discovered a novel catalyst preparation procedure which involves only a single calcination step, and which yields silica-promoted catalysts of unexpectedly high activity, considering the unorthodox nature of the process. In brief summary the process involves the following essential steps:

(A) ion exchanging a silica-alumina hydrogel containing about 50-90 wt.% SiO$_2$ with an ammoniacal solution of a cobalt and/or nickel compound to incorporate therein by ion exchange at least about 2 wt.% of Co and/or Ni;

(B) homogeneously admixing the undried solid product from step (A) with a boehmite alumina hydrogel, a molybdenum compound, in most cases additional cobalt and/or nickel compound, and sufficient water to provide an extrudable plastic mixture;

(C) extruding the plastic mixture to provide extrudates of desired size and shape; and (D) drying and calcining the extrudates.

The principal unorthodox feature of this process is that most or all of the Ni and/or Co component is selectively combined with the silica-alumina hydrogel portion of the support, while the molybdenum component is selectively combined with the boehmite alumina portion. Traditional thinking in the art is that the active metals should be distributed homogeneously on all portions or components of the support material. I have discovered however that if the respective active metal components are selectively deposited upon colloidal size micelles of the respective support components, such as the micelles making up silica-alumina hydrogels and boehmite hydrogels, a sufficiently intimate association of all active metal components is obtained upon drying, calcining and sulfiding the catalysts. Such a result would not be obtainable if either of the support components were in the form of a dried or calcined gel when contacted with the active metal component, for as is well known the drying or calcining of such hydrogels brings about a coagulation of the colloidal micelles into much larger aggregates. Any active metal penetrating into the interior of such aggregates obviously could not form an active association with a different active metal deposited on other support particles. But in the case of colloidal micelles, most of the active metal is deposited on the exterior surfaces thereof, and thus is available for intimate contact with active metals deposited on the exterior surfaces of other micelles.

PRIOR ART

U.S. Pat. No. 3,364,131 to Watkins discloses nickel-molybdena-alumina-silica catalysts having improved denitrogenation activity prepared by conventional impregnation of calcined alumina-silica cogels with solutions of nickel and molybdenum compounds, followed by drying and calcining. This procedure requires multiple calcination steps, and does not provide for selective ion exchange of the nickel component into the exchange sites of the alumina-silica cogel. To effect ion exchange, an ammoniacal nickel solution is required, which is not disclosed.

U.S. Pat. No. 3,328,316 to Mulaskey discloses hydrocracking catalysts comprising nickel deposited by "chemisorption" on dried silica-alumina composites containing 25-90% silica. The "chemisorption" is effected by contacting the silica-alumina composite with an ammoniacal nickel salt solution. Passing mention is made of forming a hydrofining catalyst by impregnating the Ni-SiO$_2$-Al$_2$O$_3$ composite with molybdenum or tungsten. This procedure also requires multiple calcinations, and would not provide the unique type of metals distribution achieved herein by the selective deposition of metals on separate hydrogel components of the supported material.

DETAILED DESCRIPTION

Reference is now made to the accompanying drawing, which is a flow diagram illustrating certain preferred catalyst preparation methods of the invention. In the succeeding description it will be understood that sufficient of the various catalyst ingredients will be used to produce finished catalysts falling within the following composition ranges:

| Catalyst Composition, Wt. % | | |
|---|---|---|
| | Broad Range | Preferred Range |
| CoO and/or NiO | 1 – 10 | 3 – 8 |
| MoO$_3$ | 5 – 35 | 8 – 25 |
| SiO$_2$ | 5 – 40 | 10 – 30 |
| Al$_2$O$_3$ | Balance | |
| Wt. Ratio, (CoO + NiO)/MoO$_3$ | 0.1 – 1 | 0.12 – 0.5 |

In step 1, the silica-alumina hydrogel comprises about 50-90 wt.% preferably about 60-80 wt.% SiO$_2$, and should have an ion exchange capacity of about 0.5-5, preferably about 1-5 meq./g, on a dry basis. Such hydrogels may be prepared in conventional manner by acidifying sodium silicate-sodium aluminate solutions, or by cogelling aluminum salt solutions with sodium silicate solutions, followed by washing with water containing ammonia or ammonium salts until substantially free of sodium ions and undesirable anions such as sulfate or chloride ions. Suitable hydrogels may also comprise silica-alumina "graft copolymers" prepared in known manner by impregnating silica hydrogel with an aluminum salt followed by precipitation of alumina gel with ammonium hydroxide in the pores and interstices of the silica hydrogel.

To effect rapid and complete ion exchange of Co and/or Ni into the hydrogel (i.e. to saturate its exchange capacity) the hydrogel is slurried in a concentrated ammoniacal solution of a salt (preferably a carbonate) or hydroxide of Co and/or Ni. Ammonia solutions containing 20–28 wt.% $NH_3$ are preferred. Sufficient Ni and/or Co salt is dissolved therein to provide about 1.2–3 meq. thereof per meq. of exchange capacity of the silica alumina hydrogel. With constant stirring at room temperature, the exchange is usually complete in 5–30 minutes. The overall amount of Co and/or Ni added in this step should amount to at least about 25%, and preferably from about 40–100% of the total Co and/or Ni content of the finished catalyst. On a dry basis, the silica-alumina hydrogel will comprise about 10–10 wt.% of the final composite support material.

Step 2 is a conventional filtration or centrifuging operation, wherein the wet ion exchanged filter cake is separated from a filtrate containing the excess Co and/or Ni and ammonia in solution. The filtrate is ordinarily recycled to step 1.

In step 3, the filter cake from step 2 is washed with water in conventional fashion until substantially all extractable anions and cations are removed. The washed filter cake will then contain about 2–20 wt.% of non-water-extractable Co and/or Ni held at the ion exchange sites of the hydrogel.

At step 4, the filter cake from step 3 is blended homogeneously with the remaining catalyst components, i.e. gelatinous boehmite hydrogel, the molybdenum component, and any additional Co and/or Ni required in the finished catalyst. Sufficient water is also added to provide a stirrable mixture. Suitable molybdenum compounds include ammonium heptamolybdate, molybdic acid, cobalt molybdate, nickel molybdate, aluminum molybdate, etc. The latter compound, $(AlO)_2 \cdot MoO_4 \cdot xH_2O$, is believed to be formed when any of the previously mentioned molybdenum compounds interact with a boehmite hydrogel as, e.g.:

$$2AlO \cdot OH \cdot xH_2O + H_2MoO_4 \cdot xH_2O \rightarrow$$
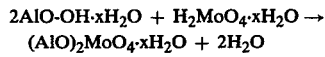
$$(AlO)_2MoO_4 \cdot xH_2O + 2H_2O$$

Due to the surface acidity of the Co and/or Ni-exchanged silica-alumina hydrogel present in the mixture, little or none of the acidic molybdate ions become associated therewith.

Any additional Co and/or Ni added at step 4 should be in a relatively non-acidic form, such that the final pH of the mixture in step 4 is above about 5.0, preferably between about 7 and 10. Acidic mixtures tend to bring about displacement of ion-exchanged nickel and/or cobalt from the silica-alumina hydrogel. Preferred nickel and cobalt compounds include the molybdates, hydroxides, carbonates and the like, which do not introduce extraneous anions or cations that would have to be removed by subsequent washing.

A particularly preferred mode of compositing the boehmite hydrogel, Mo, Ni and Co components for addition at step 4 is illustrated in steps 3a and 3b. In step 3a, cobalt- and/or nickel molybdate is formed by reacting in an aqueous slurry a mole excess of a suitable molybdenum compound, preferably $MoO_3$, with a suitable cobalt and/or nickel compound, preferably the hydroxides or carbonates. The slurry is stirred and heated at about 70°–100° C. for about 0.5–3 hours, whereupon essentially all of the Co and/or Ni is converted to crystalline molybdates.

In step 3b the reacted slurry from step 3a is mixed thoroughly with a slurry of boehmite alumina hydrogel (preferably peptized with a small amount of added acid, e.g. acetic acid). During the mixing and the subsequent drying and calcining steps, the boehmite alumina is believed to react with the cobalt and/or nickel molybdate, illustratively as follows:

$$2AlO\text{-}OH \cdot xH_2O + CoMoO_4 \cdot xH_2O \rightarrow$$
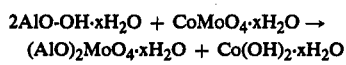
$$(AlO)_2MoO_4 \cdot xH_2O + Co(OH)_2 \cdot xH_2O$$

In cases where no additional Co or Ni is required to be added at step 4, step 3a will of course be omitted, as indicated by the broken line. Also, since there is normally a large mole-excess of molybdenum compound over the amount required to form molybdates with the added Co and/or Ni compound, such mole-excess quantities can bypass step 3a via the broken line.

From the foregoing, it will be apparent that the mixture formed in step 3b will comprise boehmite alumina hydrogel, a reactive molybdenum compound such as $H_2MoO_4$, probably some aluminum molybdate, and in most cases cobalt- and/or nickel molybdate. These mixtures are transferred directly to step 4 for intimate admixture with the nickel and/or cobalt exchanged silica-alumina hydrogel.

Following admixture in step 4, the resulting slurry is partially dried in step 5, and mulled if necessary in step 6, so as to form a plastic, extrudable mixture. Extruding at step 7 is carried out using conventional equipment and techniques, to form extrudates of any desired size and shape, usually about 1/32–¼ inch in diameter.

The final drying and calcining in step 8 is also conventional, normally in air at 800°–1300° F. for 1–12 hours. After calcination, X-ray analysis of the product shows no detectable $CoMoO_4$ or $NiMoO_4$, and the intensity of the boehmite diffractograms is substantially decreased, which indicates that substantially all molybdate salts have reacted with a portion of the boehmite.

USE OF CATALYSTS

The catalysts of this invention can be used to advantage for the denitrogenation and/or desulfurization of substantially any mineral oil feedstock, including light and heavy gas oils, cycle oils, naphthas, kerosene, turbine fuels, diesel fuels, reduced crude oils, residual oils, etc. The hydrofining conditions are conventional, falling within the following ranges:

|  | Hydrofining Conditions | |
|---|---|---|
|  | Broad Range | Preferred Range |
| Temp. ° F | 400–900 | 550–800 |
| Pressure, psig | 200–3000 | 500–2000 |
| LHSV | 0.2–10 | 1–5 |
| $H_2$/oil, SCF/B | 200–5000 | 500–3000 |

Prior to contact with the feedstock, the catalyst should be presulfided with $H_2S$ or an $H_2S$-yielding compound at temperatures ranging between about 100°–900° F. Presulfiding the ion exchanged catalysts of this invention is especially important for developing maximum activity. The Ni and/or Co added by ion exchange remains associated with the ion exchange sites throughout the preparation and calcination, and it is only upon sulfiding that zeolitic exchange bonds are broken, liberating active acidic exchange sites and active CoS and/or NiS hydrogenation sites. It is believed important that these active acidic and hydrogenation sites are inherently formed in close proximity to each other.

The following non-limiting examples are illustrative of the invention:

EXAMPLES 1–5

Five comparison catalysts were prepared with varying $SiO_2$ contents, utilizing the following components in steps 1, 3a, 3b and 4 of the drawing:

Table 1

| | Catalyst | | | | |
|---|---|---|---|---|---|
| | A | B | C | D | E |
| Step 1: | | | | | |
| $CoCo_3$, g | | 25 | | 50 | 50 |
| $SiO_2$-$Al_2O_3$ hydrogel, g[(1)] | | 1000 | | 2000 | 2000 |
| $NH_4OH$ (28%), ml | | 1000 | | 1600 | 1500 |
| Resulting Filter Cakes, g[(2)] | | 815 | | 1216 | 1840 |
| Step 3a: | | | | | |
| $MoO_3$, g | 80 | 60 | 60 | 106 | 108 |
| $CoCO_3$, g | 50 | 33.8 | 33.8 | 48.8 | 35 |
| $H_2O$, ml | 200 | 200 | 200 | 300 | 300 |
| Step 3b: | | | | | |
| Boehmite, g[(3)] | 2400 | 1900 | 1800 | 3000 | 2680 |
| $H_2O$, ml | 1500 | 800 | 800s | 1120 | 1400 |
| AcOH, mls | — | 10 | 10 | 6 | 0 |
| Slurry from step 3a, ml | all | all | all | all | all |
| Step 4: | | | | | |
| Filter Cake from Step 3, g | | 250 | 500 | 900 | 1790 |
| Water, ml | | 500 | 500 | 1600 | 3200 |
| Slurry from step 3b, ml | | all | all | all | all |

[(1)]Contained 13 wt. % of oven-dried (120° C) solids; $SiO_2/Al_2O_3$ weight-ratio - 75/25; ion exchange capacity, 1.7 meq./g.
[(2)]Containing about 15–20 wt. % oven-dried solids.
[(3)]Contained 22.7 wt. % $Al_2O_3$ in hydrogel form.

In step 1, the $CoCO_3$ was first reacted with the $NH_4OH$ solutions for about 3 hours, then filtered, giving dark brownish purple filtrates. The $SiO_2$-$Al_2O_3$ hydrogel was then added and the resulting slurries were thoroughly mixed for about 5 minutes in a high speed blender. The slurries were filtered and in each case washed with about 8 liters of distilled water. The washings became almost colorless, indicating that very little Co was being leached out. However, chemical analysis of samples of dried filter cakes showed Co contents of 5.75, 6.45 and 7.9 wt.% respectively for the B-C, D and E filter cakes.

In step 3a, the $MoO_3$ was first slurried with the water and heated to about 90–100° C., after which the $CoCO_3$ was added gradually with stirring over a period of about 15–20 minutes to prevent excessive foaming from $CO_2$ evolution. The slurries were then allowed to react at 90°–100° C. for 60 to 150 minutes. X-ray analysis of samples of the resulting products showed the presence of well-crystallized $CoMoO_4$.

In step 3b the gelatinous boehmite was first homogenized for 3–4 minutes in water and acetic acid (if used), then blended and homogenized for 3–5 minutes with the cobalt molybdate slurries from step 3a. In the case of catalyst A, this step completes the preparation, except for the final drying, extruding and calcining steps.

In step 4, for catalysts B, C, D and E, the indicated proportions of cobalt-saturated $SiO_2$-$Al_2O_3$ hydrogel filter cakes from step 3 were first slurried in water, then thoroughly homogenized for 2–3 minutes with the respective slurries from step 3b.

Following step 4 (or step 3b in the case of catalyst A), the homogenized mixtures were partially dewatered by evaporation overnight in an oven at a temperture of 180° F., and then at temperatures up to about 340° F. with intermittent mixing and stirring until an extrudable consistency was reached. The mixtures were then extruded through a 0.076″ diameter die, air dried, then further dried at temperatures increasing about 45° C./hour to 650° C., and then calcined at 700°–725° C. for one hour. The composition and properties of the resulting catalysts were as follows:

Table 2

| Catalyst: | A | B | C | D | E |
|---|---|---|---|---|---|
| $MoO_3$, wt. % | 11.6 | 11.9 | 11.3 | 11.4 | 11.9 |
| CoO, wt. % | 5.14 | 4.44 | 4.78 | 4.19 | 4.11 |
| $SiO_2$, wt. % | 0 | 3.9 | 7.6 | 13.9 | 20.0 |
| $Al_2O_3$ | | | balance | | |
| Surface Area, $m^2$/g | 274 | 331 | 341 | 369 | 338 |
| Pore Volume, ml/g | 0.46 | 0.48 | 0.60 | 0.65 | 0.53 |
| Bulk Density, g/ml | 0.76 | 0.73 | 0.62 | 0.59 | 0.68 |

Neither the dried extrudates nor the calcined catalysts exhibited a $CoMoO_4$ X-ray pattern, and the intensity of the boehmite diffractorgrams was substantially reduced, showing that during the mixing and drying steps, the original $CoMoO_4$ had reacted with a portion of the boehmite.

EXAMPLES 5–10

The above catalysts, after presulfiding, were tested for desulfurization and denitrogenation activity, using as the feedstock a light diesel oil containing 230 ppm of basic nitrogen, 390 ppm total nitrogen and 6500 ppm of sulfur. For each catalyst two runs were carried out, one at 2.5 LHSV and the other at 5.0 LHSV, the other conditions being 700° F., 700 psig of $H_2$, and 3000 SCF of $H_2$/B. The averaged relative activities of the catalysts, based on standard kinetic calculations were found to be as follows:

Table 3

| | Relative Activities | | | | |
|---|---|---|---|---|---|
| Catalyst: | A | B | C | D | E |
| Wt. % $SiO_2$ | 0 | 3.9 | 7.6 | 13.9 | 20.0 |
| Total N Denitrogenation [(1)] | 1.0 | 1.15 | 1.67 | 1.42 | 1.67 |
| Desulfurization [(2)] | 1.0 | 1.13 | 1.27 | 1.05 | 1.03 |

[(1)]Based on first order kinetics
[(2)]Based on 1.5 order kinetics

Upon repeating four of the tests at 675° F., the averaged results were as follows:

Table 4

| | Relative Activities | | | |
|---|---|---|---|---|
| Catalyst: | A | B | C | D |
| Wt. % $SiO_2$ | 0 | 3.9 | 7.6 | 13.9 |
| Total N Denitrogenation | 1.0 | 1.18 | 1.80 | 1.62 |
| Desulfurization | 1.0 | 1.12 | 1.18 | 0.95 |

It will be apparent that the silica-containing catalysts exhibited much improved denitrogenation activities, and in most cases considerably improved desulfurization activities, compared to catalyst A.

EXAMPLE II

Another catalyst (F) was prepared in the same manner as catalyst E, except that all of the cobalt was added at step 3a and steps 1, 2 and 3 were omitted, the silica-alumina hydrogel being added as such to step 4. Thus, in this case, little or none of the cobalt was ion exchanged into the hydrogel. The resulting catalyst analyzed 20 wt.% $SiO_2$, 11.7 wt.% $MoO_3$ and 3.63 wt.% CoO. Upon activity testing as described in the preceding examples, the activities relative to catalyst A were found to be as follows:

Total N Denitrogenation — 1.15
Desulfurization — 0.81

It will be seen that this catalyst is approximately equivalent to catalyst B which contained only 3.9% $SiO_2$. It is thus evident that the promotional effect of silica-alumina hydrogel is much enhanced by saturating its ion exchange capacity with cobalt prior to contact with other reactive materials.

The following claims and their obvious equivalents are believed to define the true scope of the invention.

I claim:

1. A method for the manufacture of a silica-promoted cobalt- and/or nickel-molybdenum-alumina hydrofining catalyst, which comprises:
   (A) ion exchanging a silica-alumina hydrogel containing about 50–90 wt.% $SiO_2$ with an ammoniacal solution of a cobalt and/or nickel compound to incorporate therein by ion exchange at least about 2 wt.% of Co and/or Ni, and water-washing the exchanged hydrogel to remove extractable ions therefrom;
   (B) homogeneously admixing the undried solid product from step (A) with a boehmite alumina hydrogel, the desired molybdenum component and sufficient water to provide an extrudable plastic mixture;
   (C) extruding the plastic mixture to provide extrudates of desired size and shape; and
   (D) drying and calcining the extrudates.

2. A method as defined in claim 1 wherein said silica-alumina hydrogel has an ion exchange capacity between about 0.5 and 5 meq/g.

3. A method as defined in claim 1 wherein an additional nickel and/or cobalt compound is added to the composition at step (B).

4. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 1.

5. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 2.

6. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 3.

7. A method for the manufacture of a silica-promoted cobalt- and/or nickel-molybdenum-alumina hydrofining catalyst, which comprises:
   (A) ion exchanging a silica-alumina hydrogel containing about 50–90 wt.% $SiO_2$ with an ammoniacal solution of a cobalt and/or nickel compound to incorporate therein by ion exchange at least about 2 wt.% of Co and/or Ni, and water-washing the exchanged hydrogel to remove extractable ions therefrom;
   (B) separately reacting gelatinous boehmite alumina in aqueous suspension with the desired molybdenum component;
   (C) homogeneously admixing the undried solid products from steps (A) and (B), together with sufficient water to provide an extrudable plastic mixture;
   (D) extruding the plastic mixture to provide extrudates of desired size and shape; and
   (E) drying and calcining the extrudates.

8. A method as defined in claim 7 wherein said silica-alumina hydrogel has an ion exchange capacity between about 0.5 and 5 meq/g.

9. A method as defined in claim 7 wherein said reactive molybdenum compound in step (B) comprises $MoO_3$.

10. A method as defined in claim 7 wherein said reactive molybdenum compound in step (B) comprises preformed cobalt- and/or nickel molybdate.

11. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 7.

12. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 8.

13. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 9.

14. A catalyst composition comprising about 1–10 wt.% NiO and/or CoO, about 5–35 wt.% $MoO_3$, about 5–40 wt.% $SiO_2$, and the balance substantially $Al_2O_3$, said catalyst having been prepared by the method of claim 10.

* * * * *